(12) United States Patent
Zhou

(10) Patent No.: US 10,491,306 B2
(45) Date of Patent: Nov. 26, 2019

(54) RF-PHOTONIC PULSE DOPPLER RADAR

(71) Applicant: Weimin Zhou, Rockville, MD (US)

(72) Inventor: Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 242 days.

(21) Appl. No.: 15/451,456

(22) Filed: Mar. 7, 2017

(65) Prior Publication Data
US 2019/0020417 A1    Jan. 17, 2019

(51) Int. Cl.
| | | |
|---|---|---|
| H04B 10/524 | (2013.01) | |
| G01S 7/03 | (2006.01) | |
| G01S 7/285 | (2006.01) | |
| G01S 13/34 | (2006.01) | |
| G01S 13/58 | (2006.01) | |
| G01S 7/32 | (2006.01) | |
| G01S 7/40 | (2006.01) | |
| H04B 1/03 | (2006.01) | |
| H04B 10/25 | (2013.01) | |

(52) U.S. Cl.
CPC .......... *H04B 10/524* (2013.01); *G01S 7/032* (2013.01); *G01S 7/285* (2013.01); *G01S 13/34* (2013.01); *G01S 13/581* (2013.01); *H04B 1/03* (2013.01); *H04B 10/2504* (2013.01); *G01S 7/32* (2013.01); *G01S 2007/4065* (2013.01); *H04B 2210/006* (2013.01)

(58) Field of Classification Search
CPC .... H04B 10/524; H04B 10/2504; H04B 1/03; H04B 2210/006; G01S 13/34; G01S 13/581; G01S 7/032; G01S 7/285; G01S 7/32; G01S 2007/4065
USPC ........................................................ 398/189
See application file for complete search history.

(56) References Cited

U.S. PATENT DOCUMENTS

| | | | |
|---|---|---|---|
| 8,532,486 B2 * | 9/2013 | Stead ................. | H04B 10/2575 398/116 |
| 2010/0259440 A1 * | 10/2010 | Li .......................... | G01S 7/415 342/90 |

* cited by examiner

*Primary Examiner* — Dalzid E Singh
(74) *Attorney, Agent, or Firm* — Alan I. Kalb

(57) ABSTRACT

Systems, methods, architectures, mechanisms or apparatus for receiving and storing electromagnetic pulses using photonics includes a transmission unit transmitting electromagnetic pulses; an antenna receiving electromagnetic pulses reflected from a target; an optical recirculation loop for storing replica received electromagnetic pulses; and a processor for extracting target related phase information from the replica received electromagnetic pulses.

6 Claims, 4 Drawing Sheets

RF-PHOTONIC PULSE DOPPLER RADAR

GOVERNMENT INTEREST

The embodiments described herein may be manufactured, used and/or licensed by or for the United States Government without the payment of royalties thereon.

FIELD OF THE DISCLOSURE

The embodiments herein generally relate to receiving electromagnetic waves, and, more particularly, to receiving and storing electromagnetic waves using photonics.

BACKGROUND

Current pulse Doppler radar systems generate and transmit toward a target object many hundreds or thousands of signal pulses to provide a number of returned signal pulses sufficient to extract therefrom Doppler effect information for determining target object velocity. While target object range may be determined via pulse timing techniques, some systems require separate processing of returned signal pulses for ranging and velocity processing, which may require complex transmission signal pulses (e.g., added reference pulses, different pulses depending upon target distance and so on). These systems are complex and, during the time needed for the necessary amount of signal pulse transmission and reception, vulnerable to detection and countermeasures.

SUMMARY

Various deficiencies in the prior art are addressed by systems, methods, architectures, mechanisms and/or apparatus configured to augment pulse Doppler radar with optical delay/storage of a returned signal pulse to effectively extend the time during which information represented by the returned signal pulse is available for processing.

In particular, embodiments are disclosed in which a relevant returned signal pulse modulates a laser to drive a fiber loop to (effectively) store the returned signal pulse information as a series of optical pulse replicas of known characteristic within the loop. The series of optical pulse replicas are converted to RF and processed in a known manner to extract therefrom both range and velocity information.

The resulting system is only vulnerable to detection/countermeasures during a very short period of time (a pulse or two duration) while providing both range and velocity information and doing so in a less complicated manner than previously known.

For example, one embodiment comprises a system for detecting a target reflecting electromagnetic pulses transmitting from the system, the system comprising: a transmission unit transmitting electromagnetic pulses; an antenna receiving electromagnetic pulses reflected from the target; an optical modulator that uses the received electromagnetic pulse to modulate a laser light pulse; a main optical recirculation loop for circulating therein an optical replicas are produced by the modulated laser input pulse; and a processor for extracting target related phase information from a signal comprising a plurality of replica pulses retrieved from the main optical recirculation loop.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
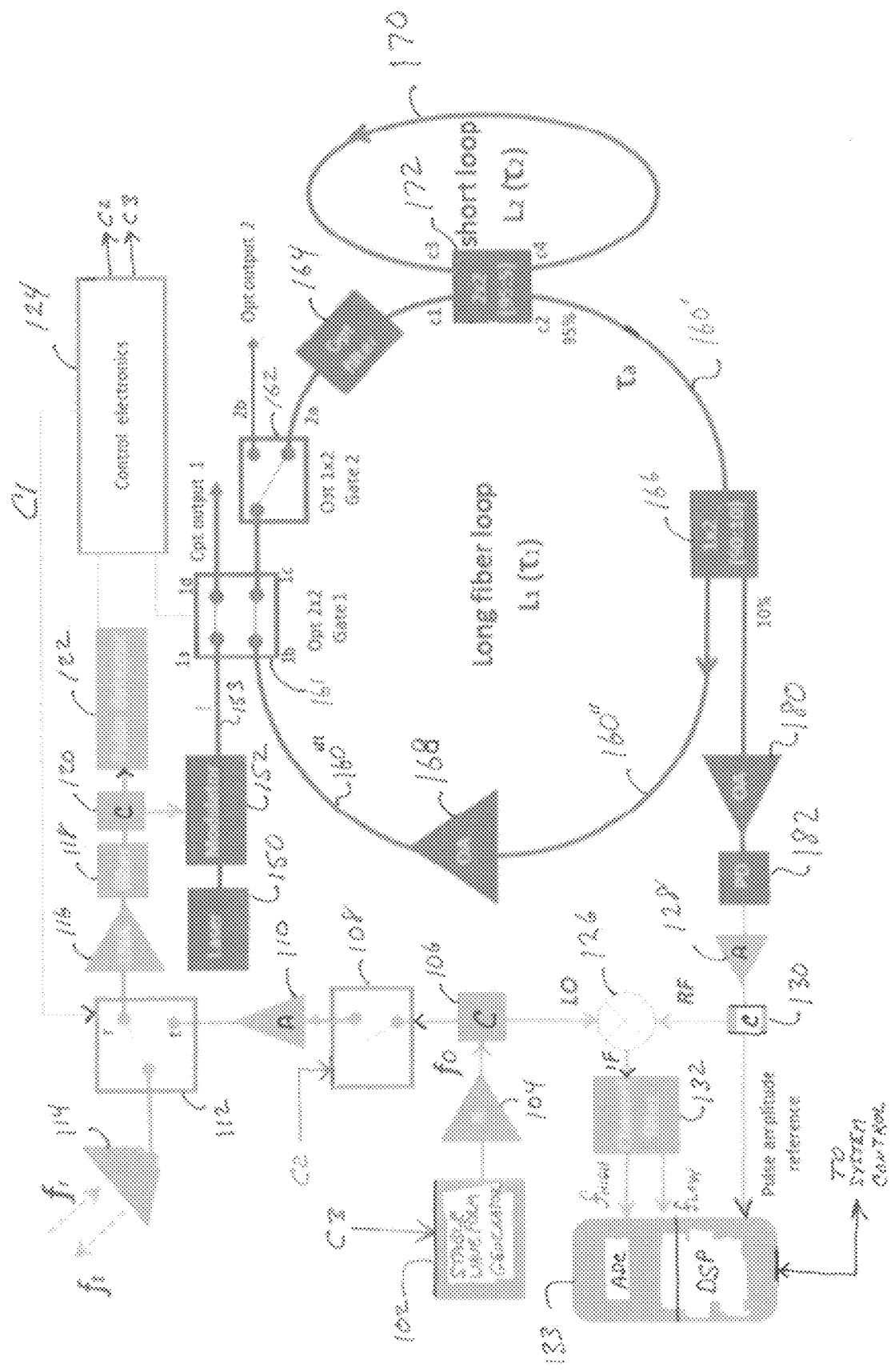
FIG. 1 depicts a high-level block diagram of a radar system according to an embodiment herein.

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Generally speaking, the various embodiments enable, support or improve pulse Doppler radar by providing an architecture of an RF-Photonic pulse Doppler and ranging Radar system using fiber-optical recirculation loop circuits. A short RF signal pulse is transmitted and received by the system, the received pulse is carried by an optical laser carrier and circulated in a fiber-optical loops circuit to generate many replicas in time which will allow the detection of Doppler frequency and phase (Ranging information) when mixed with a stable CW RF local oscillator signal.

Specifically, a fiber-optical recirculation loop is used to carry a single received short RF "life" signal pulse over long period of time to generate thereby hundreds or thousands of replica pulses (depending upon the number of circulations of the pulse) such that the replicas of the pulse in each circulation so the single input short pulse can expend in time travel which will allow to resolve a small Doppler shift frequency (with high resolution) that has a time period thousands time large than the pulse width of the short input signal.

Various embodiments provide a system architecture using a stable oscillator-produced continuous wave (CW) reference signal to mix with a fiber-optical recirculation loop generated pulse replicas train to obtain thereby Doppler shift/frequency information. Various systems may comprise a dual loop system in which a long main optical recirculation loop is used to extend the total circulation time of optical pulse replicas of received RF pulses to increase the frequency resolution of the Doppler shift/frequency information. Various systems may include a small recirculation optical recirculation loop coupled to the main loop to produce a second pulse replicas train with shorter time spacing to allow finer determination of the phase information for the received RF pulse signal. Various systems may use an RF pulse detector with a narrow filter to estimate a rough range of a target, and use the phase information to determine a more precise range of the target.

The various embodiments significantly reduce the radar transmission time to thereby, so to reduce Radar receiving down time and self-jamming. It can also be covered and less susceptible for jamming. It can do both ranging and Doppler detection to provide more precision for target search/tracking.

FIG. 1 depicts a high-level block diagram of a radar system architecture according to an embodiment herein.

In FIG. 1, radar system 100 includes a stable radiofrequency (RF) oscillator source such as a stable waveform generator 102. The stable waveform generator 102, in response to a control signal C3 received from control electronics 124, operates in either of a transmit mode or a receive mode to generate an output waveform or signal $f_o$ which is amplified via a low noise amplifier 104 and split via a 1×2 RF coupler 106. A first output of the RF coupler 106 provides signal to a switch 108 and a second output of the RF coupler 106 provides signal to a mixer 126

In a transmit mode, stable waveform generator 102 may be caused to generate a continuous wave (CW), chirped pulse or other type of signal $f_o$ (illustratively a 10 GHz carrier signal including a square wave or other waveform such as frequency chirped waveform) suitable for use in a transmit unit of a Doppler radar system. That is, since various types of radar transmission signals a be used depending upon a particular objective, the stable waveform generator 102 generates a signal $f_o$ which may be used directly or further processed (e.g., via controlled switches 108 and 112) to provide thereby a radar transmission signal $f_t$.

In a receive mode, stable waveform generator 102 may be caused to generate a simple or complex signal $f_o$, typically referred as local oscillator signal, suitable for mixing with a radiofrequency (RF) replica signal as will be discussed in more detail below. For example, in the case of a 10 GHz waveform generated in the transmit mode, and illustrative receive mode signal may comprise a 9.99 GHz signal such that subsequent mixing results in and intermediate frequency (IF) signal having sufficient resolution to extract therefrom Doppler information, as will be discussed in more detail below Pulse Transmit/Receive Unit In a transmit mode of operation, a control signal C2 provided by control electronics 124 causes switch 108 to couple CW signal $f_o$ to a first (transmit (t)) terminal of a switch 112 (via amplifier 110) for a short duration Δt (typically 1 μs or less) to form thereby a short transmission pulse signal, which transmission pulse signal is coupled via switch 112 to antenna 114 for transmission thereby as a radio frequency (RF) pulse $f_t$ to search and track a target. In a receive mode of operation, antenna 114 receives a return RF pulse signal $f_r$ which is coupled to a second (receive (r)) terminal of switch 112. Switch 108 is synchronized with switch 112 via one or more of control signals C1 and C2 from control electronics 124 such that the short transmission pulse is provided to switch 112 when in a transmit position (antenna connected to transmit terminal of switch 112), after which switch 112 returns to a receiving position (antennal connected to receive terminal of switch 212).

When the pulsed signal $f_t$ is bounced back by a moving target, the antenna 114 receives a Doppler shifted RF pulse with frequency $f_r$. This signal is amplified by a low noise amplifier/filter combination (116/118) having a narrow filter bandwidth selected to substantially allow only the Doppler shifted signal to pass therethrough. The filtered signal is split by a RF coupler 120 having a first output coupling a first portion of the filtered signal to a RF pulse detector 122, and a second output coupling a second portion of the filtered signal to an optical modulator 152. The pulse detector operates to detect received RF pulse signals and indicate such detection to the control electronics 124. The optical modulator 152 operates to modulate a coherent optical signal generated by a laser 150 to provide an RF modulated optical signal 1 which is coupled to a first input port 1a of a 2×2 optical gate 161 via a length of optical fiber 153.

Pulse Replica Storage Unit

When a received RF pulse signal is detected within a predefined time frame (i.e., search range), the control electronics 124 cause the 2×2 optical gate 161 to operate in a pulse introduction mode by coupling the RF modulated laser signal 1 from the first input port 1a to a second output port 1c for introduction thereby to a fiber optic recirculation loop L1.

In particular, by selecting an appropriate length of fiber for the fiber connection 153 the RF pulse modulated laser signal 1 may be gated during a time period slightly larger than Δt to form an optical pulse (replicating the received RF pulse signal) that is sent into the fiber optic recirculation loop L1 (e.g., a 10 Km optical fiber) with a delay time τ1 to allow time for signal recirculation and processing.

The embodiment of FIG. 1 depicts a fiber optic recirculation loop L1 generally formed using optical fiber(s) 160 having a length (e.g., 10 km) selected in accordance with time delay/processing requirements. The fiber optic recirculation loop L1 also includes a number of serially connected optical components for performing various tasks as described herein; namely, a 2×2 optical gate 161, a 1×2 optical gate 162, an optical filter 164, an optional 2×2 optical coupler 172 (used in conjunction with an optional short fiber loop 170), a 1×2 optical coupler 166, one or more optical amplifiers 168 as well as various other standard components (not shown for simplicity). As will be appreciated by those skilled in the art, different types of optical components and/or differently connected optical components may be used to achieve the broad purposes described herein. As such, the specific order and type of optical components described herein is not intended to limit the implementation of recirculation loop L1 in accordance with various embodiments.

After the optical pulse is introduced to the recirculation loop L1, the control electronics 124 cause the 2×2 optical gate 161 to operate in a pulse circulation mode by coupling a second input port 1a (receiving signal as part of the optical signal path of fiber optic recirculation loop L1) to the second output port 1c to maintain thereby a closed optical signal path. Further, during pulse circulation mode the first input port 1a is coupled to a second output port 1d such that any additional signal received via fiber length 153 (such as received during a loop processing time) may be sent to another (e.g., duplicate) fiber optic recirculation loop, a fiber-optical buffered delay loop to store the signal for later processing, or to some other structure (not shown).

The control electronics 124 cause 1×2 optical gate 162 to operate in a pass-through mode wherein optical signal of interest circulating through the loop is allowed to continue circulating therethrough, or in a dump mode wherein optical signal not of interest (e.g., noise built up in the loop and the like) is diverted from the loop.

The optical filter 164 comprises a narrow band optical filter configured to clean the optical noise signal in frequency/wavelength domain in the loop.

The optional 2×2 coupler 172, when used in recirculation loop L1, provides a mechanism for coupling optical signal received at an input port ($c_1$) to each of a first output port ($c_2$) connected to loop L1 and a second output port ($c_4$) connected to optional loop L2. A coupling ratio about 95% to 5% (or 90% to 10% etc.) may be selected such that a majority of optical signal power is retained within recirculation loop L1. In particular, first output port ($c_2$) is coupled to an input port of the 1×2 optical coupler 166 via a length of optical fiber 160' as part of loop L1, while second output port ($c_4$) it is coupled to a second input port ($c_3$) of 2×2 coupler 172 via a length of fiber 170 to form thereby short optical recirculation loop L2.

It is noted that there is a time delay $\tau a$ between the output ($c_2$) of 2×2 coupler 172 and the input of 1×2 coupler 166.

The 1×2 coupler 166 comprises, illustratively, a coupler having a 90% to 10% output coupling ratio.

The 90% output port of 1×2 coupler 166 provides optical pulse replicas via a long fiber 160" to optical amplifier 168, which provides corresponding amplified optical signal to input 1b of 2×2 optical gate 161 to thereby complete the loop cycle.

The optional second (short) fiber optic recirculation loop L2 is connected by the 2×2 optical coupler in the long recirculation loop L1. The L2 loop length is significantly smaller (e.g., a few meters to a kilometer) than that of L1 depending upon the application need and/or a need for the L2 round trip loop delay time of $\tau 2$ to be longer that the pulse width $\Delta t$). In the disclosed embodiments, 5% of the optical signal power from long recirculation loop L1 is coupled into the short recirculation loop L2 via coupler 172. The input signal is depicted as circulating in recirculation loop L2 without amplification to produce thereby replica pulses with smaller time spacing $\tau 2$ than the time spacing $\tau 1$ of recirculation loop L1. These pulse replicas are coupled back to recirculation loop L1 via coupler 172 (i.e., received from recirculation loop L2 via second input c3 of coupler 172 and injected into recirculation loop L1 via first output port c2). The optical noise generated by the optical amplifier 168 and unwanted residue of signal can be cleaned/suppressed in recirculation loop L1 using second optical gate 162 as a time domain filter previously described.

Optical fiber 160/170 as used in the loops L1 and L2 is preferably selected to have low dispersion or have dispersion compensated fiber added (not shown) to compensate the dispersion.

Pulse Replica Processing Unit

The 10% output of 1×2 coupler 166 provides optical pulse replicas to optical amplifier 180, which provides corresponding amplified optical signal to a photo detector 182 which converts the optical signal back to an RF signal, which is amplified by a RF amplifier 128 and then split between two output ports by a RF coupler 130.

The first output port of coupler 130 is connected to an RF input port of a RF mixer 126. A local oscillator (LO) input port of the mixer 126 receives LO signal $f_{Lo}$ produced by stable oscillator/waveform generator 102 and received via amplifier 104 and coupler 106. It is noted that in modern Doppler range Radar $f_{LO}$ is typically not the same frequency as $f_r$.

The intermediate frequency (IF) output of the mixer 126 is coupled to a channelizing filter 132 which provides, illustratively, one or both of a lower frequency mixing products (DC to several MHz in some embodiments) filtered output signal $f_r - f_{LO}$ (denoted as $f_{LOW}$) that may contain Doppler frequency information associated with the received RF signal $f_r$, and a higher frequency mixing products filtered output signal $f_{RF}$ (denoted as $f_{HIGH}$) that may contain useful phase information associated with the received RF signal $f_r$. The selected filter bandwidth of the high frequency output will depend upon which mixing product are chosen to be used in subsequent signal processing operations.

The filtered output signals $f_r - f_{LO}$ and $f_{RF}$ $f_{LOW}$ and $f_{HIGH}$) of mixer 126 are coupled to analog to digital (A/D) converter input portions of a digital signal processor (DSP) 133 for subsequent processing by the DSP 133 as discussed below.

The second output of the RF coupler 130 is connected to an input of DSP 133 to provide thereto a signal including optical pulse replicas' amplitude information.

The DSP 133 utilizes the received signal to perform calibration functions and other functions in accordance with the various embodiments such as described herein. In addition, since the only useful input signals receive data DSP 133 are generated from the pulse replicas spread in time (i.e., signals in between the two pulse do not contain the RF information), DSP 133 May also perform a function of selecting only useful data points for subsequent signal processing. The various embodiments contemplate using a single recirculation loop L1, two recirculation loops (i.e., L1 and L2) or more than two recirculation loops (e.g., L1, L2 and L3 as will be described below with respect to FIGS. 3-4). DSP 133 may be implemented via a Field Programmable Gate Array (FPGA) or other programmable hardware device, a general purpose computing device such as described below with respect to FIG. 6 or any combination thereof.

Generally speaking, DSP 133 performs various processing steps including:

(1) digitizing one or more input signals received via different input ports such as signals $f_{HIGH}$ and/or $f_{LOW}$ received from channel filter 132, pulse amplitude reference (PAR) received from coupler 130, IF signal received directly from mixer 126 in some embodiments and the like;

(2) selecting useful data corresponding to time windows of interest for each pulse replica of interest;

(3) performing data normalization using the pulse amplitude reference signal if needed (i.e., normalizing signal levels to improve bit slicing and general signal processing thereof);

(4) performing Fourier transform processing of one or more received signals to determine thereby Doppler frequency information;

(5) performing time domain maximum and minimum position processing of one or more received signals to determine thereby relative phase information for the reflected RF signal $f_r$; and (6) optionally performing other functions as described herein such as providing upper processing information to a system controller (not shown), illustratively a command and control computer.

In various embodiments, the output signal IF of mixer 126 is coupled directly to DSP 133 for processing. That is, in these embodiments the functions of the channel filter 132 are performed by DSP 133.

In various embodiments, the channel filter 132 is used to provide only one of the signals $f_{HIGH}$ and $f_{LOW}$.

Figure 2:
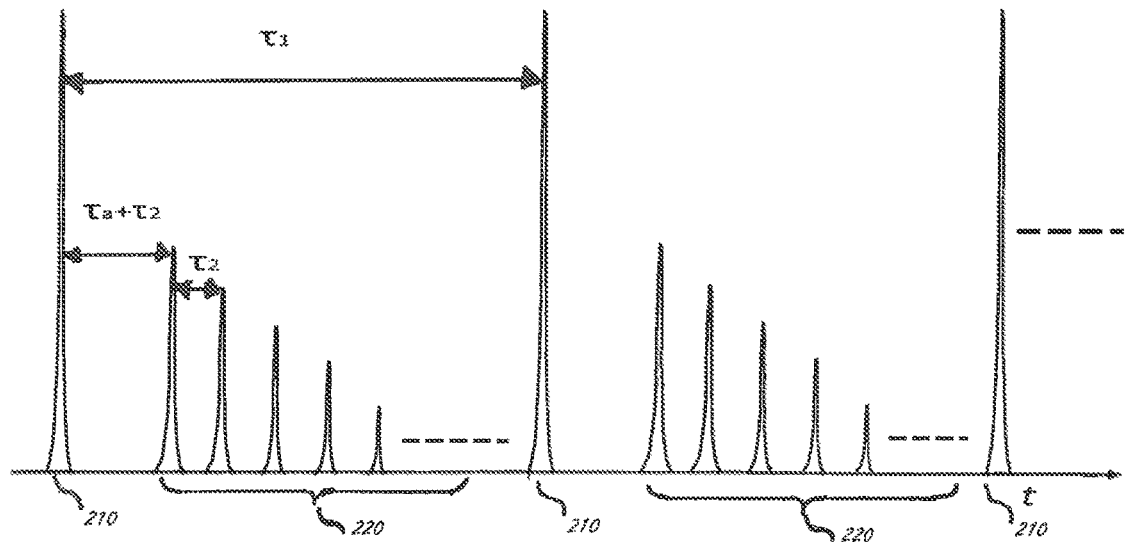
FIG. 2 graphically depicts illustrative optical pulse replica trains of received RF pulses plotted as a function of time and useful in understanding the present embodiments.

FIG. 2 graphically depicts illustrative optical pulse replica trains of received RF pulses plotted as a function of time and useful in understanding the present embodiments.

Specifically, FIG. 2 depicts a series or sequence of pulse replicas such as produced at the output of amplifier 128 after extraction from the fiber recirculation loop of FIG. 1. The pulse replicas depicted in FIG. 2 contain two sets of replicas such as may be generated in the system 100 of FIG. 1; namely, a first 210 set such as may be generated by a long recirculating loop L1 and a second set 220 such as may be generated by a short recirculating loop L2. The first set is depicted as a major set of strong pulse replicas with time spacing τ1. The second set is depicted as a minor sets of weaker pulse replicas with time spacing τ2 located between major replica peaks and offset from a corresponding first replica set peak by a time spacing τa. As depicted, the minor replicas also exhibit exponentially decayed amplitude peaks as would occur due to the uncompensated loss in loop L2 (i.e., no amplification in loop L2).

Referring to FIG. 1, the RF output signal provided by photodetector 182 and received at the RF port of mixer 126 comprises a pulse replica train that can be described by:

$$e^{i[\omega_r(t+n\tau_1+m\tau_2+\tau_a)+\Phi_r]}$$

Mixer 126 operates to mix the RF output after the photodetector with the local oscillator signal of frequency ωo and phase Φo to provide a mixed intermediate frequency (IF) output signal having low frequency products that can be described by:

$$e^{i(\omega_r-\omega_o)t} \times e^{i[\omega_r(n\tau_1+m\tau_2+\tau_a)+\Phi_r-\Phi_o]}$$

In the above IF describing equation, $\omega_r-\omega_o=\omega_D$, which is the Doppler frequency information in the range under few kHz typically if $\omega_o$ is the same frequency as the transmitted signal. This representation indicate the delay time in each cycle of the recirculation loop. Only when time match $n\tau_1+m\tau_2+\tau_a$, within the replica pulse train the mixing between the signal and LO signal occurs. There are many mixing product, other than $\omega_r-\omega_o=\omega_D$ base-band product, all other products are in high RF frequency. Therefore, having channel filter 132 providing a similar few kHz bandwidth filtering after the mixer 126 is sufficient to separate Doppler frequency components from the mixing product.

The Radar range can be determined using the time difference between pulse transmission time and received time detected by 122. However, the precision will be limited by the pulse width in travel distance which is about 300 m if pulse width is 1 us. The phase Φr−Φo contains the radar range information within the replica pulse train such that the total phase may be expressed as 2πN+φ, where N is an integer number that is related to the range distance and both initial phase condition for transmitted signal and LO reference signal. However, since N is unknown the range cannot be determined. A rough estimate of the range may be determined by using the RF pulse detector to detect the arrival time of a received pulse. Further, an "initial phase" condition (i.e., N) may be determined by calibrating the system with known distance target.

Specifically, in a calibration mode, the system 100 of FIG. 1 is used to range a target object at a known distance to determine thereby an "initial phase" condition; that is, to determine N. However, if the low frequency (Doppler band) mixing product is used, then the wavelength is in hundreds Km, corresponding a 360° phase change. So in order to obtain precise range distance we can use the higher frequency mixing product to measure φ. In various embodiments, this is performed by using LO frequency different than the transmit frequency $f_t$ to bring the IF frequency $f_r-f_{LO}$ to 10 s MHz range. Since $f_r-f_{LO}=f_t-f_{LO}+f_{Dop}$ and since $f_t-f_{LO}$, is known, the Doppler frequency can be obtained.

The DSP 134 operates to analyze maximum and minimum "time" position changes of the pulse amplitudes to determine thereby φ and, therefore, to determine a precise range distance.

Figure 3:
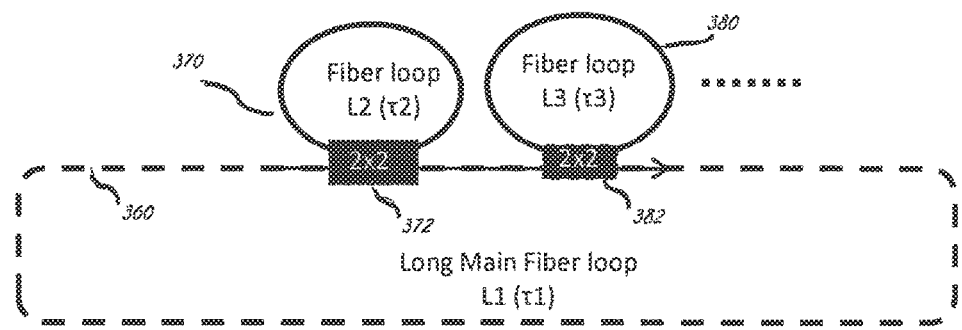
FIG. 3 depicts a simplified block diagram of an optional pulse replica storage unit.

FIG. 3 depicts a simplified block diagram of a pulse replica storage unit embodiment suitable for use in the radar system architecture described above with respect to FIG. 1.

Specifically, FIG. 3 depicts a (long) main or first fiber loop L1 (360), coupled to a second fiber loop L2 (370) via a respective 2×2 coupler 372. The first loop L1 (360), second loop L2 (370) and respective 2×2 coupler 372 operate in a similar manner to that described above with respect to the first loop L1 (160), second loop L2 (170) and 2×2 coupler 172 described above with respect to FIG. 1. Loops L1 (360) and L2 (370), when operating as described herein, are configured to provide replica pulse trains such as described above with respect to FIG. 2. It is noted that the plurality of replica pulses carry phase evolution information of the received electromagnetic pulse.

FIG. 3 also depicts a third fiber loop L3 (380) coupled to the first loop L1 (360) via a respective 2×2 couple 382. The third fiber loop L3 (380) and respective 2×2 couple 382 operate in a manner similar to that of second loop L2 (370) and respective 2×2 coupler 372.

Figure 4:
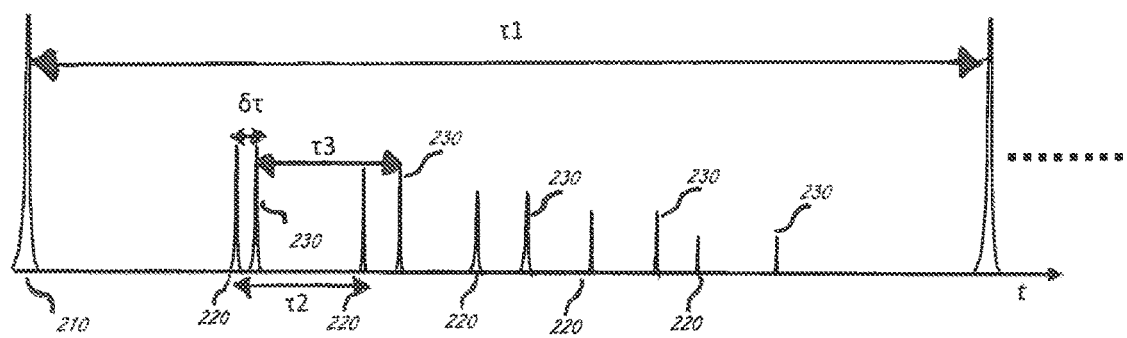
FIG. 4 graphically depicts illustrative optical pulse replicas trains of received RF pulses plotted as a function of time and useful in understanding the present embodiments.

Loop L1 (360) is associated with a loop round trip delay time of τ1, loop L2 (360) is associated with a loop round trip delay time of τ2, and loop L3 (380) is associated with a loop round trip delay time of τ3. It is noted that τ2 has to be smaller than the inverse of RF frequency fr to determine φ. Further, it is noted that the additional small loop (loop L3) may be added such that the loop round trip delay time τ3 is slightly different than τ2. For example (and as shown in FIG. 4), third loop L3 (380) may be configured to provide a third set of pulse replicas of spacing τ3. The time spacing between pulse replicas generated by loops L2 and L3 may be configured as δτ=τ2−τ3, which can be very small and, indeed, smaller than the inverse of RF frequency fr. In this manner, a finer resolution or granularity may be achieved by DSP 133 in determining Doppler information and other information.

FIG. 4 graphically depicts illustrative optical pulse replicas trains of received RF pulses plotted as a function of time and useful in understanding the present embodiments.

Specifically, FIG. 4 depicts a series or sequence of pulse replicas containing three sets of replicas such as may be generated in the system 100 of FIG. 3; namely, a first 310 set such as may be generated by a long recirculating loop L1, a second set 320 such as may be generated by a first short recirculating loop L2, and a third set 330 such as may be generated by a second short recirculating loop L3. The first set is depicted as a major set of strong pulse replicas with time spacing τ1. The second set is depicted as a minor sets of weaker pulse replicas with time spacing τ2 located between major replica peaks and offset from a corresponding first replica set peak by a time spacing τa. The second set is depicted as a minor sets of weaker pulse replicas with time spacing τ3 located between major replica peaks and offset from a corresponding first replica set peak by a time spacing (τa+δτ). As depicted, the minor replicas also exhibit exponentially decayed amplitude peaks as would occur due to the uncompensated loss in loops L2 and L3 (i.e., no amplification in loops L2 and L3).

Figure 5:
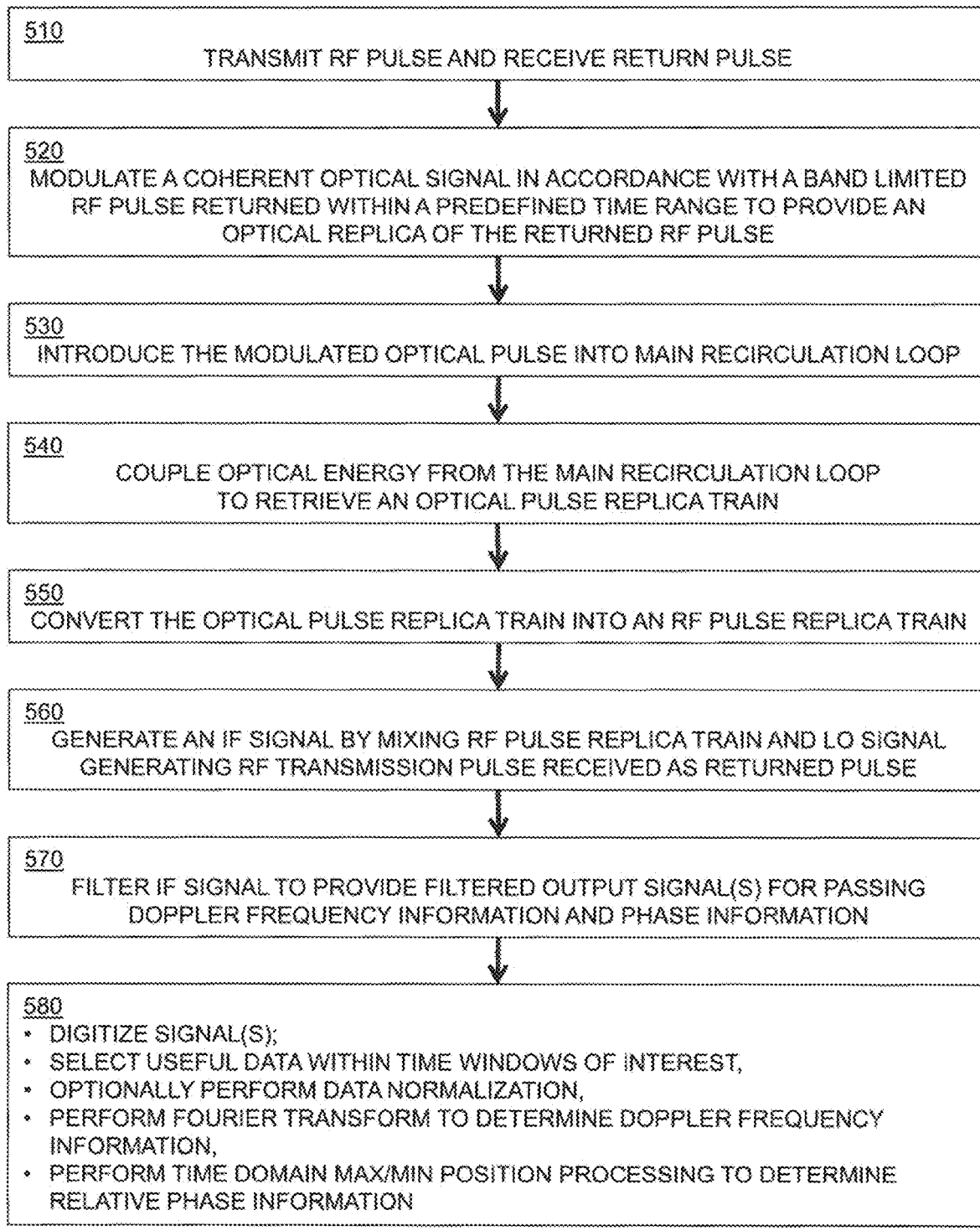
FIG. 5 depicts a flow diagram of a processing returned radio frequency (RF) pulses associated with a pulse radar system according to various embodiments.

FIG. 5 depicts a flow diagram of a processing returned radio frequency (RF) pulses associated with a pulse radar system according to various embodiments.

At step 510, an RF pulse is generated in accordance with a gated LO signal and transmitted toward a target, after which a return pulse reflected from the target may be received.

At step 510, a coherent optical signal is modulated in accordance with a band limited RF pulse returned within a predefined time range to provide an optical replica of the returned RF pulse.

At step 530, the optical replica of the returned RF pulse is introduced into a main recirculation loop for storage (i.e., recirculation).

At step 540, a coupler retrieves a portion of optical energy from the main optical recirculation loop to provide thereby an optical pulse replicas train.

At step 550, the optical pulse replicas train is converted to an RF pulse replica train.

At step 560, an IF signal is generated by mixing the RF pulse replica train and the local oscillator (LO) signal used to generate the RF transmission pulse associated with the returned RF pulse.

At step 570, the IF signal is filtered to provide one or both of a lower frequency output signal for passing Doppler frequency information and a higher frequency output signal for passing phase information. In various embodiments, both Doppler frequency and phase information may be included within one signal band, depending upon type and frequency of signals produced by stable waveform generator 102.

At step 580, various processing steps are performed by processor 133 to extract desired information, including:

(1) digitizing one or more input signals received via different input ports such as signals $f_{HIGH}$ and/or $f_{LOW}$ received from channel filter 132, pulse amplitude reference (PAR) received from coupler 130, IF signal received directly from mixer 126 in some embodiments and the like;

(2) selecting useful data corresponding to time windows of interest for each pulse replica of interest;

(3) optionally performing data normalization using the pulse amplitude reference signal if needed (i.e., normalizing signal levels to improve bit slicing and general signal processing thereof);

(4) performing Fourier transform processing of one or more received signals to determine thereby Doppler frequency information;

(5) performing time domain maximum and minimum position processing of one or more received signals to determine thereby relative phase information for the reflected RF signal $f_r$; and (6) optionally performing other functions as described herein such as providing upper processing information to a system controller (not shown), illustratively a command and control computer.

Figure 6:
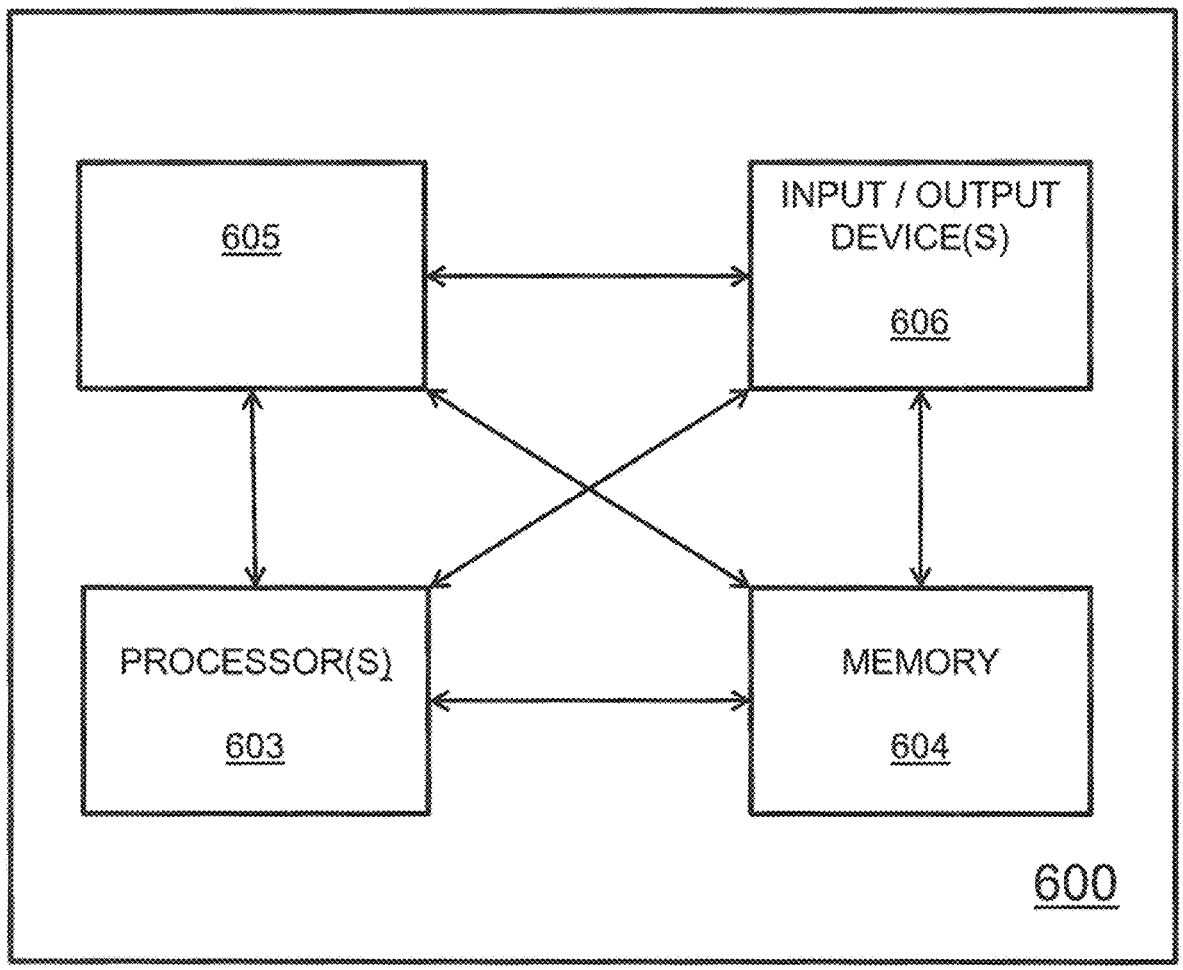
FIG. 6 depicts a high-level block diagram of a computing device, such as a digital signal processor (DSP), suitable for use in performing data selection and data processing, mathematical and other functions described herein.

FIG. 6 depicts a high-level block diagram of a computing device, such as a digital signal processor (DSP), suitable for use in performing data selection and data processing, mathematical and other functions described herein such as those associated with the various elements described herein with respect to the figures.

In particular, any of the various functional entities described herein may be implemented in accordance with a general computing device structure such as described herein with respect to FIG. 6.

As depicted in FIG. 6, computing device 600 includes a processor element 603 (e.g., a central processing unit (CPU) or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A system for detecting a target using a single reflecting electromagnetic pulse transmitted from said system, said system comprising:
   a transmission unit for transmitting electromagnetic pulse;
   an antenna for receiving electromagnetic pulses reflected from the target;
   a main optical recirculation loop for circulating therein an optical pulse replica carrying information of a received electromagnetic pulse;
   a coupling device, for tapping a portion of the circulated optical pulse replica in each circulating cycle to produce a plurality of replica pulses carrying thereby phase evolution information of the received electromagnetic pulse;
   a photodetector, for converting the plurality of optical replica pulses to a plurality of electromagnetic replica pulses;
   a mixer, for generating a beating signal by mixing a local oscillator (LO) signal with said electromagnetic replica pulses; and
   a processor for extracting target related frequency and phase information from the beating signal further comprising:
      a mixer, for generating an intermediate frequency (IF) signal by mixing a local oscillator (LO) signal associated with said transmitted electronic pulse and a radio frequency (RF) signal in accordance with a pulse replicas train provided by said main optical recirculation loop; and
      a channelizing filter configured to filter said IF signal and provide to said processor a lower frequency output signal for passing Doppler frequency information and a higher frequency output signal for passing phase information.

2. The system of claim 1, further comprising:
   a second optical recirculation loop; and
   a coupler for coupling to said second optical recirculation loop a portion of replica pulse optical energy circulating in said main optical recirculation loop, and for coupling to main optical recirculation loop a portion of replica pulse optical energy circulating in said second optical recirculation loop;
   said main and second optical recirculation loops have associated with them loop delay times of $\tau 1$ and $\tau 2$, respectively, wherein $\tau 1 > \tau 2$.

3. The system of claim 2, further comprising:
   a third optical recirculation loop; and
   a coupler for coupling to said third optical recirculation loop a portion of replica pulse optical energy circulating in said main optical recirculation loop, and for coupling to main optical recirculation loop a portion of replica pulse optical energy circulating in said third optical recirculation loop;
   said third optical recirculation loop having associated with it a loop delay time of $\tau 3$, wherein $\tau 1 > \tau 3$.

4. The system of claim 1, wherein a size of said main optical recirculation loop is selected in accordance with a sufficient processing time delay and a round trip loop travel time exceeding a width of an optical pulse replica.

5. A method of processing returned radio frequency (RF) pulses associated with a pulse radar system, comprising:
   modulating a coherent optical signal in accordance with a band limited RF pulse returned within a predefined time range to provide an optical replica of the returned RF pulse;
   circulating said optical replica in a main optical recirculation loop;
   coupling a portion of optical energy from said main optical recirculation loop to provide thereby an optical pulse replicas train;
   processing optical pulse replicas train to extract therefrom target related frequency and phase information from a signal comprising a plurality of replica pulses retrieved from the main optical recirculation loop;
   wherein processing said optical pulse replicas train comprises:
      converting said optical pulse replicas train to a radio frequency (RF) pulse replicas train;
      mixing said RF pulse replicas train and a local oscillator (LO) signal associated with said returned RF pulse to generate an intermediate frequency (IF) signal;
      filtering said IF signal to provide a lower frequency output signal for passing Doppler frequency information and a higher frequency output signal for passing phase information; and
      extracting target Doppler information from said lower frequency output signal.

6. The method of claim 5, further comprising:
   coupling a portion of replica pulse optical energy circulating in said main optical recirculation loop to a second optical recirculation loop; and
   coupling a portion of optical energy from said second optical recirculation loop to said main optical recirculation loop to provide therein a second optical pulse replicas train;
   said main and second optical recirculation loops having associated with them loop delay times of $\tau 1$ and $\tau 2$, respectively, wherein $\tau 1 > \tau 2$.

* * * * *